(12) United States Patent
Ray et al.

(10) Patent No.: US 7,503,707 B2
(45) Date of Patent: Mar. 17, 2009

(54) METHODS FOR SPLICING OPTICAL FIBERS USING AN OPTICAL FIBER REPAIR APPARATUS WITH ADJUSTABLE GUIDE MEMBER

(75) Inventors: Craig Ray, Fuquay Varina, NC (US); Jackie Moore, Benson, NC (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 11/983,024

(22) Filed: Nov. 6, 2007

(65) Prior Publication Data

US 2008/0085085 A1 Apr. 10, 2008

Related U.S. Application Data

(62) Division of application No. 11/106,242, filed on Apr. 14, 2005, now Pat. No. 7,310,470.

(51) Int. Cl.
*G02B 6/255* (2006.01)

(52) U.S. Cl. .............................. 385/97; 385/95; 385/96; 385/98; 385/99; 385/100; 385/134; 385/135; 385/136; 385/137; 385/147

(58) Field of Classification Search ........... 385/95–100, 385/134–137, 147
See application file for complete search history.

(56) References Cited

U.S. PATENT DOCUMENTS

| | | | |
|---|---|---|---|
| 4,729,625 A | 3/1988 | Loscoe et al. | 385/98 |
| 4,940,307 A | 7/1990 | Aberson et al. | 350/96.21 |
| 5,345,526 A | 9/1994 | Blew | 385/112 |

(Continued)

FOREIGN PATENT DOCUMENTS

EP 0 810 455 12/1997

(Continued)

OTHER PUBLICATIONS

Invitation to Pay additional Fees w/ Communication relating to the Results of the Partial International Search for PCT/US2006/011789; date of mailing Mar. 8, 2006.

*Primary Examiner*—Brian Healy
*Assistant Examiner*—Hung Lam
(74) *Attorney, Agent, or Firm*—Myers Bigel Sibley & Sajovec

(57) ABSTRACT

Methods for splicing optical fibers include coupling a first optical fiber cable to a longitudinally extending closure frame and coupling a second optical fiber cable to an adjustable guide member on the closure frame. The adjustable guide member is moved toward the first optical fiber cable to provide a distance between the first and second optical fiber cable less than an exposed length of the first and second optical fiber therebetween to provide a slack length of optical fiber. Cleaved exposed ends of a first optical fiber from the first optical fiber cable and a second optical fiber from the second optical fiber cable are positioned proximate each other in a splice station displaced from the closure frame utilizing the slack length of optical fiber. The first and second optical fibers are spliced in the splice station and the adjustable guide member is moved away the first optical fiber cable to remove the slack length and position the spliced optical fibers in the closure frame.

9 Claims, 8 Drawing Sheets

U.S. PATENT DOCUMENTS

| | | | |
|---|---|---|---|
| 5,353,366 A * | 10/1994 | Bossard | 385/134 |
| 5,440,665 A | 8/1995 | Ray et al. | 385/135 |
| 5,495,549 A | 2/1996 | Schneider et al. | 385/135 |
| 5,530,785 A | 6/1996 | Sakamoto et al. | 385/136 |
| 6,866,430 B1 | 3/2005 | Faiss et al. | 385/96 |
| 2002/0009279 A1 | 1/2002 | Maron et al. | 385/137 |
| 2002/0150369 A1 * | 10/2002 | Battey et al. | 385/135 |
| 2004/0190839 A1 * | 9/2004 | Bush et al. | 385/96 |
| 2004/0252960 A1 * | 12/2004 | Battey et al. | 385/135 |

FOREIGN PATENT DOCUMENTS

| | | |
|---|---|---|
| EP | 0 874 253 | 11/2001 |
| JP | 2002267870 | 9/2002 |

\* cited by examiner

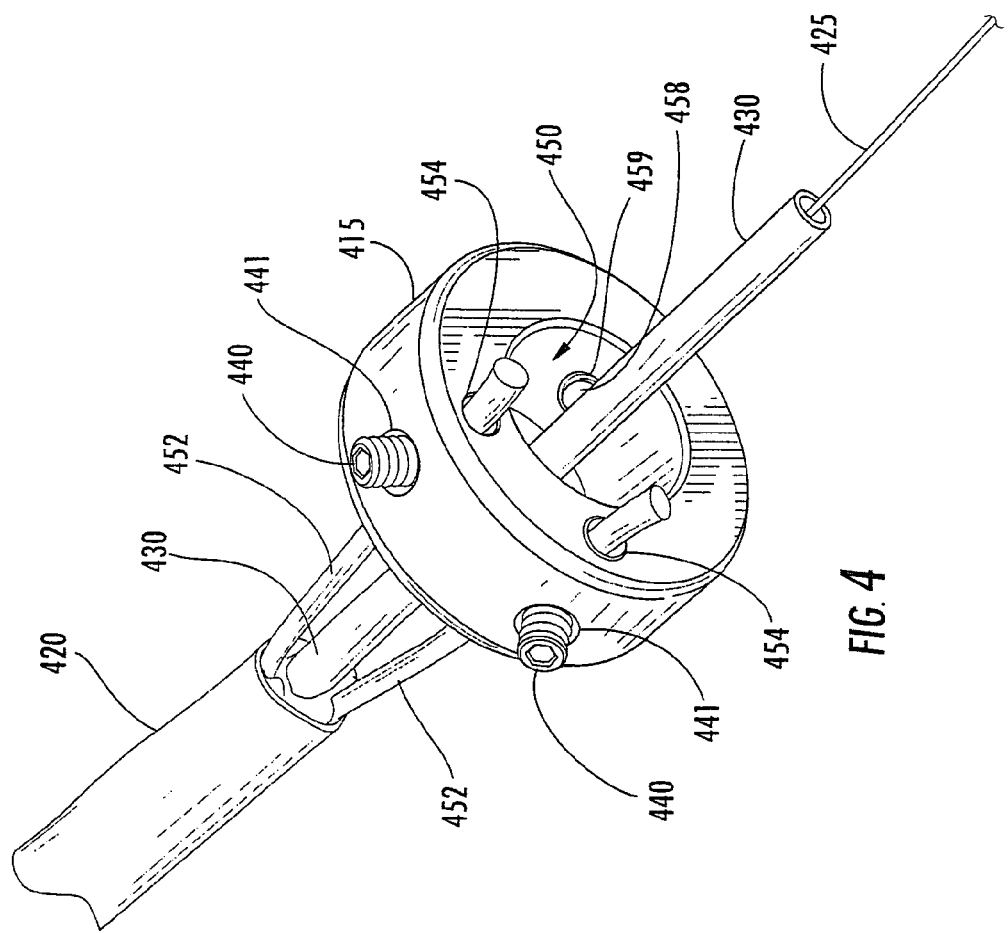
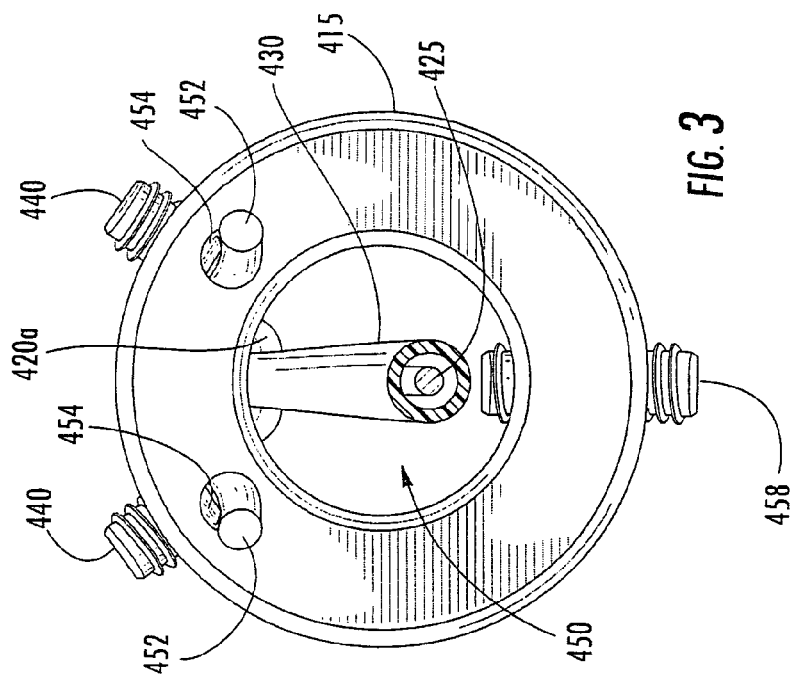

METHODS FOR SPLICING OPTICAL FIBERS USING AN OPTICAL FIBER REPAIR APPARATUS WITH ADJUSTABLE GUIDE MEMBER

CROSS-REFERENCE TO RELATED APPLICATIONS

This application is a divisional of U.S. application Ser. No. 11/106,242, filed Apr. 14, 2005, now U.S. Pat. No. 7,310,470 the content of which is herein incorporated by reference in its entirety as if set forth fully herein.

BACKGROUND OF THE INVENTION

The present invention relates to communication cable termination devices and, more particularly, to optical fiber repair apparatus and methods for using the same.

An extensive infrastructure supporting telecommunication has been developed, traditionally based upon copper wire connections between individual subscribers and telecommunications company network distribution points. More recently, much of the telecommunications network infrastructure is being extended or replaced with an optical fiber based communications network infrastructure. Fiber optic cables are widely used for telecommunications applications where high information capacity, noise immunity and other advantages of optical fibers may be exploited. Fiber cable architectures are emerging for connecting homes and/or business establishments, via optical fibers, to a central location, for example.

A typical main fiber optic cable may be installed underground and have multiple drop cables connected thereto, each of a hundred feet or more. Each of the drop cables, in turn, is routed to an optical network unit (ONU) serving several homes. Accordingly, information may be transmitted optically to the ONU, and into the home via conventional copper cable technology. Thus, the drop cables may serve groups of users, although other architectures may also employ a main cable and one or more drop cables connected thereto.

Unfortunately, the fibers within the main cable must typically be accessed at the various drop points and spliced to respective drop cables after the main cable has already been installed. Accessing the main cable for splicing generally requires careful preparation of the main cable including removing a portion of the cable sheath, and identifying and separating out predetermined fibers from within the cable without disturbing adjacent fibers. The separated fibers may then be spliced and secured within a conventional protective splice closure. Moreover, these cable access and splicing steps must typically be accomplished in the field by a technician who is likely to experience difficulties imposed by weather or the particular location of each of the drop points. Accordingly, field splicing of drop cables to a main cable may be time consuming, expensive, and may produce low quality optical splices.

In addition to drop point termination splicing operations, the installed optical fiber cables may be subject to damage over time. For example, a drop cable could be inadvertently cut with a resulting loss of service over the optical fibers therein. Rather than replace the cabling infrastructure to repair the damage, the cut drop cable may be repaired by cleaving and splicing the severed ends of the optical fibers in the drop cable. However, in addition to the problems discussed above with drop point termination splicing operations, difficulties may be encountered in physically connecting ends of a cut optical fiber based on available length of fiber on each end and limitations on the ability to move the respective ends into an adjacent position for splicing and then to return the repaired cable into use without damaging the optical fiber(s).

SUMMARY OF THE INVENTION

Embodiments of the present invention include optical fiber repair apparatus including a longitudinally extending closure frame having a longitudinally extending optical fiber receiving groove in a face thereof. An adjustable guide member on the closure frame is longitudinally movable thereon to adjust a position of an optical fiber of a first optical fiber cable in the groove. A first attachment member is configured to couple the first optical fiber cable to the guide member with the optical fiber of the first optical fiber cable extending into the optical fiber receiving groove. A retainer is configured to couple a second optical fiber cable to the closure frame with an optical fiber of the second optical fiber cable extending into the optical fiber receiving groove.

In other embodiments of the present invention, the adjustable guide member is configured to direct the optical fiber of the first optical fiber cable into the groove. The retainer may be configured to direct the optical fiber of the second optical fiber cable into the groove. The retainer may be a second adjustable guide member configured to direct the optical fiber of the second optical fiber cable into the groove and having a second attachment member configured to couple the second optical fiber cable to the second adjustable guide member. The optical fiber of the first optical fiber cable may be positioned in an optical fiber tube and the adjustable guide member may be configured to direct the optical fiber tube into the groove.

In further embodiments of the present invention, the adjustable guide member is a slide member having an opening therein configured to slidably engage an outer surface of the closure frame and the optical fiber tube is received into the opening and directed to the groove by contact with the slide member in the opening. The opening may include a rotary limit portion configured to contact a rotary limit portion of the closure frame to limit rotational movement of the guide member about the closure frame.

In other embodiments of the present invention, the first optical fiber cable further includes a strength member and the attachment member is configured to connect the strength member to the guide member. The guide member may include a strength member receiving opening therein configured to receive the strength member for attachment therein and the strength member receiving opening may be positioned to provide an angular displacement between the strength member and the optical fiber tube extending from the first optical fiber cable to force the optical fiber tube against the guide member in the opening in the guide member and direct the optical fiber tube into the groove.

In yet other embodiments, the first optical fiber includes two strength members extending therein on opposite sides of the optical fiber tube and the guide member includes two strength member receiving openings therein positioned above the closure frame and the opening in the guide member and on opposite sides of the groove. The closure frame may further include a longitudinally extending guide channel configured to receive a flat drop cable and/or longitudinally extending contact surfaces configured to receive a round drop cable. The contact surfaces may include edges of the groove.

In further embodiments of the present invention, a splice cover is provided that is configured to be positioned on the closure frame over the groove. An outer closure may be positioned around and enclosing the closure frame to provide environmental sealing for a cable splice therein and/or strain relief for the first and second optical fiber cables extending therein. The outer closure may be, for example, a heatshrink and/or cold seal outer closure.

In yet further embodiments of the present invention, a cable fixture is provided that is configured to receive and retain the closure frame at a position proximate a splice device. The cable fixture may include a cable frame configured to receive the closure frame, a first retention member configured to retain the first optical fiber cable and a second retention member configured to retain the second optical fiber cable.

In other embodiments of the present invention, methods for splicing optical fibers include coupling a first optical fiber cable to a longitudinally extending closure frame. A second optical fiber cable is coupled to an adjustable guide member on the closure frame. The adjustable guide member is moved toward the first optical fiber cable to provide a distance between the first and second optical fiber cable less than an exposed length of the first and second optical fiber therebetween to provide a slack length of optical fiber. Cleaved exposed ends of a first optical fiber from the first optical fiber cable and a second optical fiber from the second optical fiber cable are positioned proximate each other in a splice station displaced from the closure frame utilizing the slack length of optical fiber. The first and second optical fibers are spliced in the splice station and the adjustable guide member is then moved away the first optical fiber cable to remove the slack length and position the spliced optical fibers in the closure frame.

In further embodiments of the present invention, positioning exposed cleaved ends is preceded by exposing a length of the first optical fiber, exposing a length of the second optical fiber and cleaving respective exposed ends of the first and second optical fiber. Moving the adjustable guide member may be followed by securing the adjustable guide member to the closure frame in a position where the spliced optical fibers therein have the slack length removed and environmentally sealing the closure frame with the spliced optical fibers therein. Environmentally sealing may be preceded by placing a cover on the closure frame with the spliced optical fibers therein and environmentally sealing may include securing a heatshrink and/or cold seal outer closure around the closure frame. Moving the adjustable guide member may be preceded by coupling a cable fixture to a splice apparatus including the splice station and coupling the closure frame to the cable fixture.

In yet other embodiments of the present invention, the method includes repairing a broken fiber drop cable where the break defines a first exposed end and a second exposed end of a broken optical fiber therein. The first exposed end is an exposed end of the first optical fiber cable. The second optical fiber cable is a bridging optical fiber cable with an opposite cleaved end of the second optical fiber extending from the bridging optical fiber. The opposite cleaved end of the second optical fiber is spliced to the second exposed end of the broken optical fiber cable using a second closure frame.

In further embodiments of the present invention, the first optical fiber is a first plurality of optical fibers and the second optical fiber is a second plurality of optical fibers. Splicing the first and second optical fibers includes splicing respective ones of the first and second plurality of optical fibers. Splicing the first and second optical fibers may be followed by positioning a protective sleeve over the splice and moving the adjustable guide member may include positioning the protective sleeve in the closure frame. The second optical fiber cable may include a strength member and coupling the second optical fiber cable to an adjustable guide member may include connecting the strength member to the adjustable guide member.

BRIEF DESCRIPTION OF THE DRAWINGS

FIG. 3 is a side view of an adjustable guide member having a drop cable coupled thereto according to some embodiments of the present invention;

FIG. 4 is a perspective view of an adjustable guide member having a drop cable coupled thereto according to some embodiments of the present invention;

DETAILED DESCRIPTION

Figure 1A:
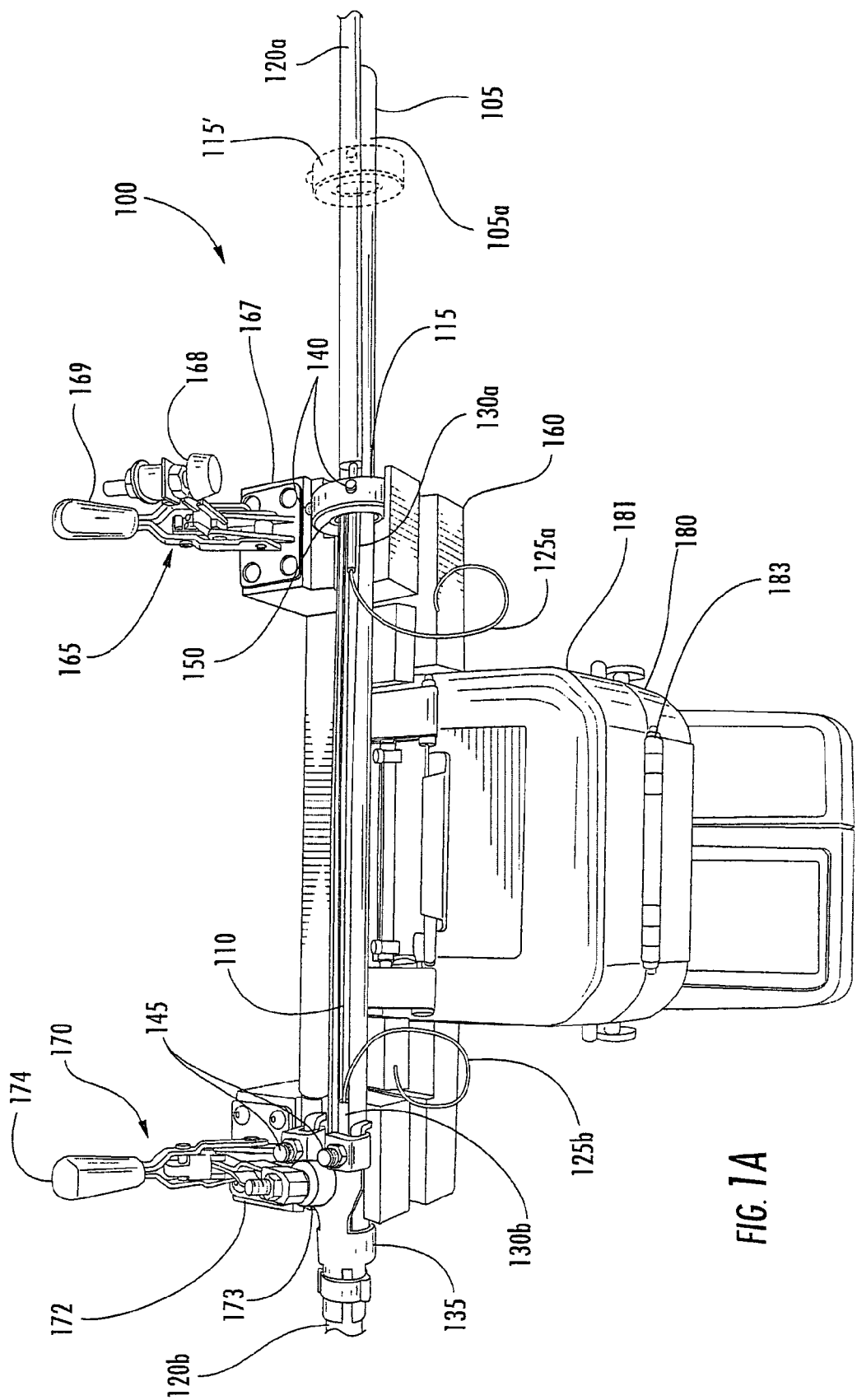
FIG. 1A is a perspective view illustrating an optical fiber repair apparatus according to some embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the present invention will now be described with reference to the various embodiments illustrated in FIGS. 1A-8. Referring first to FIGS. 1A and 2, the optical fiber repair apparatus 100 according to some embodiments of the present invention provides for splicing of an optical fiber 125a in a first optical fiber cable 120a to a second optical fiber 125b in a second optical fiber cable 120b. For example, the first and second optical fiber cables 120a, 120b may be respective ends of a broken optical fiber drop cable to be re-connected using the apparatus 100. As would readily be understood by those skilled in the art, a drop cable is typically a low fiber count cable, such as 2 or 4 fibers, while a main cable typically includes a larger number of optical fibers. As also shown in FIG. 1A, the optical fibers 125a and 125b may be within respective optical fiber tubes 130a, 130b.

As will be described more fully below, various embodiments of optical fiber repair apparatus and methods according to the present invention can be used in a fiber optic network, for example, to repair or re-connect fibers or cables. Such fiber, fiber cables and fiber splices can be damaged, broken or become otherwise defective in the field. In various embodiments of the present invention, one or two closures may be used to re-establish the continuity of the fiber network. The closure may be used for fusion splicing flat drop style fiber cable or other type splices or cable types. The closure itself may be low profile and, in some embodiments, may be installed wherever repairs are needed whether aerial, below grade or buried applications. The damaged sections of the cable can either be removed and replaced using two repair closures, one at each end, or be re-established in some embodiments using a single closure. The selection of the approach to use for repair may be based on a consideration of how much free cable length is available at the location of the break or damaged section of cable to determine if a bridging cable is needed between the broken ends.

It will generally be understood that in order to re-splice a given section of fiber cable, the fiber must generally first be prepared. For example, for a section of flat drop sheath cable, approximately 7 inches may be removed of the sheath from the end of the cable. This may be accomplished, for example, by making a ring cut and removing the jacket from this length. The cable may include a loose buffer tube (LBT) and the loose buffer tube may also be removed to within an inch or so of the ring cut leaving about 6 inches of bare fiber or fibers.

The optical fiber cable 120a, 120b may be connected to the retainer 135 or guide member 115 after removing a portion of the sheath from the drop cable and after removing a length of the exposed loose buffer tube. The connection to the retainer 135 or guide member 115 in other embodiments of the present invention may be between removing of the sheath and removing of an exposed portion of the loose buffer tube. By removing the loose buffer tube after attaching the retainer 135 or guide member 115, the loose buffer tube may provide further protection to the optical fiber itself during the attachment operations.

It is generally important to accurately cleave fibers before splicing. Cleaving a fiber will shorten the available fiber length and the ends of the original fiber are generally discarded, exposing the new cleaved fiber ends. These cleaved fiber ends can then be spliced together to generally provide reliable connections. Cleaving fibers typically reduces the fiber length available by approximately 0.5 inch.

As shown in the embodiments of FIGS. 1A and 2, the optical fiber repair apparatus 100 includes a longitudinally extending closure frame 105 with a longitudinally extending optical fiber receiving groove 110 in an upper face thereof. An adjustable guide member 115, 115' is positioned on the closure frame 105 so as to be longitudinally moveable on the closure frame 105. The adjustable guide member 115, as will be further described herein, may be used to adjust the position of an optical fiber 125a of a first optical fiber cable 120a in the groove 110 and relative to the optical fiber 125b and cable 120b so that the optical fibers 125a, 125b can be moved into a splicing apparatus 180 for repair and then returned into the groove 110 of the closure member 105 without any slack coils of optical fiber therein.

Also shown in FIGS. 1A and 2 is a first attachment member 140 in the adjustable guide member 115 that is configured to couple the first optical fiber cable 120a to the adjustable guide member 115 with the optical fiber 125a and tube 130a extending into the optical fiber receiving groove 110. More particularly, the first attachment member 140 shown in the embodiments of FIG. 1A and 2 is a pair of set screws 140 as will be described further herein.

Also shown in the embodiments of FIGS. 1A and 2 is a retainer 135 configured to couple the second optical fiber cable 120b to the closure frame 105 with the optical fiber 125b and tube 130b of the second optical fiber cable 120b extending into the optical fiber receiving groove 110. The retainer 135 shown in the illustrated embodiments includes an attachment member 145 to attach the second optical fiber cable 120b to the retainer 135, shown as a pair of set screws 145 in the illustrated embodiments of FIGS. 1A and 2. As will be described further herein, the set screws 140, 145 may be utilized to attach strength members extending from the respective optical fiber cables 120a, 120b to the guide member 115 and the retainer 135.

Figure 1B:
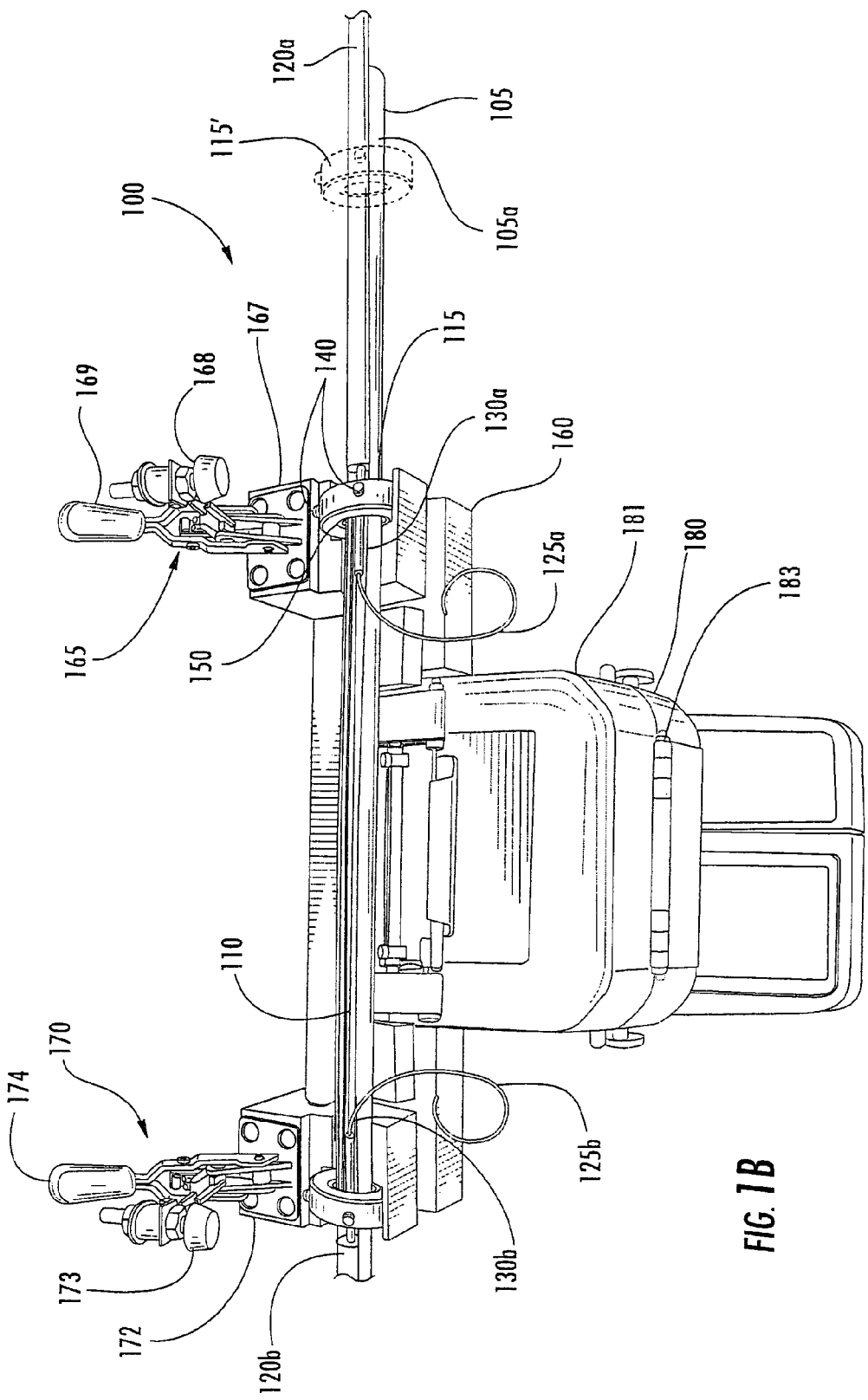
FIG. 1B is a perspective view illustrating an optical fiber repair apparatus according to some embodiments of the present invention.
Figure 2:
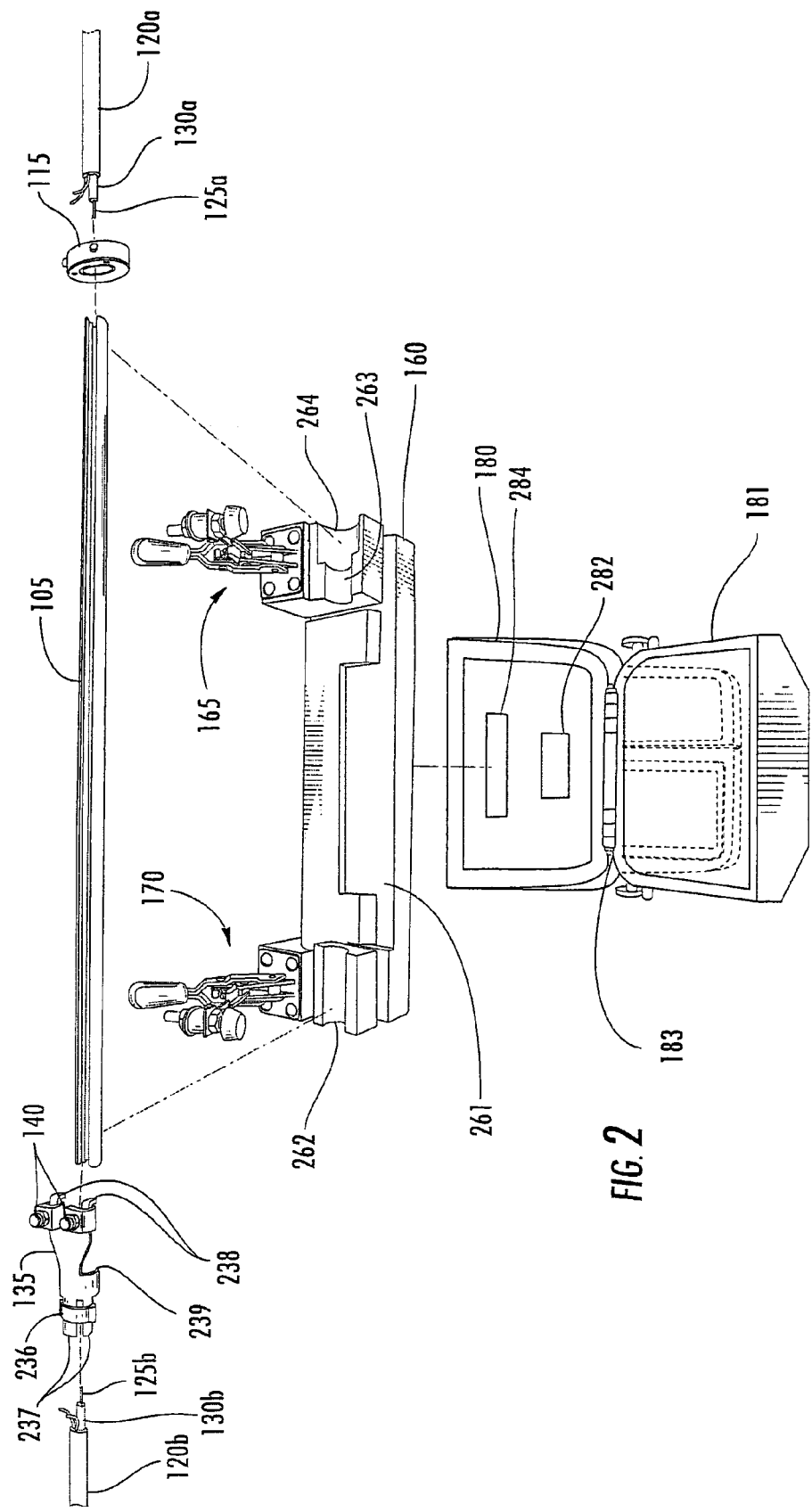
FIG. 2 is an exploded perspective view of the apparatus of FIG. 1A.

As illustrated in the embodiments of FIG. 1B, an adjustable guide member 115a may be used in place of the retainer 135. Thus, for the embodiments illustrated in FIG. 1B, a slack length of optical fiber may be provided by both guide members 115, 115a. Furthermore, it will be understood that the general configuration of the retainer 135 may itself be configured to be longitudinally moveable on the closure frame 105 and both the retainer and adjustable guide member may be configured in a manner illustrated for the retainer 135 in FIGS. 1A and 2.

As shown in the embodiments of FIGS. 1A and 2, the adjustable guide member 115 has an opening 150 therein that is configured to slidably engage an outer surface 105a of the closing member 105. Thus, the adjustable guide member 115 may move from a position 115 to a position 115', as illustrated in dotted line in FIG. 1, by being slid longitudinally along the closure frame 105.

Also shown in the embodiments of the FIGS. 1A and 2 is a cable fixture 160 configured to receive and retain the closure frame 105 at a position proximate a splice device 180. A first retention member 165 configured to retain the first optical fiber cable 120a connected to the cable fixture 160 is also shown in FIGS. 1 and 2. The retention member 165 includes a bracket 167 for connecting the retention member 165 to the cable fixture 160 and a contact pad 168 for clamping the closure frame 105 and/or adjustable guide member 115 in a desired longitudinal position on the cable fixture 160. A lever 169 is used to activate movement of the retention member 165 to move the compression member 168 to open and closed positions thereof. The compression member 168, in some embodiments of the present invention, is a compliant material that may reduce the risk of damage to the adjustable guide member 115 or closure member 105 due to variability in the parts when clamping a closure frame 105 to the cable fixture 160. Also seen in the embodiments in FIGS. 1A and 2 is a second retention member 170, that, similarly to the first retention member 165 includes an activating lever 174, a bracket 172, and a compression member 173 for securing and retaining the second optical fiber cable 120b in position relative to the cable fixture 160.

As best seen in FIG. 2, the splice apparatus 180 may include a cover 181 rotatably attached to the splice apparatus 180 by a hinge 183. A splice station 282 may be located under the cover 181 and be assessable by opening cover 181 so as to receive cleaved ends of the fibers 125a and 125b for splicing the cleaved ends together to repair the optical fiber. Also shown in FIG. 2 is a heating station 284 that may be used, for example, to heat shrink a protective sleeve that may be slid over the spliced ends of the optical fibers 125a, 125b to provide protection and/or mechanical support to the newly spliced connections.

Additional aspects of the cable fixture 160, according to some embodiments of the present invention, are also visible in the explode perspective view of FIG. 2. As shown in FIG. 2, respective channels 262 and 263 are configured to receive the closure frame 105 therein. Also shown is a wider diameter channel portion 264 that has a diameter selected to allow movement of the adjustable guide member 115 into the channel 264. Finally, a coupling region 261 of the closure fixture 160 may be configured to mate with corresponding features of the splice device 180 to facilitate positioning of the cable fixture 160 proximate the splice device 180. Further details of the retainer 135 are also shown and will be further described with reference to FIG. 2.

As seen in FIG. 2, the retainer 135 may include longitudinally extending finger members 237 passing over the optical fiber cable 120b with an attachment member 236, such a tie wrap or the like, wrapped around the fingers 237. Where it is desired to utilize the retainer 135 as an adjustable guide member, curved portions 239 of the retainer 135 may be configured to slidably engage the outer surface 105a of the closure frame 105 for longitudinal movement along the closure frame 105. The attachment member 236 may be pre-compressed to provide a connection between the retainer 135 and the cable 120b while continuing allowing slideable movement of the retainer 135 along the closure member 105 or may be compressed with the closure frame 105 therein to provide further mechanical attachment to the closure frame 105 rather than to the optical fiber cable 120b.

As noted previously, the optical fiber cable 120b may be attached to the retainer 135 using the set screws 140. More particularly, a pair of strength members extending from the cable 120b may be inserted up against respective stop arms 238 of the retainer 135 and then the set screws 140 may be tightened thereon to retain the strength members and, thereby, the optical fiber cable 120b coupled to the retainer 135.

The relationship between the adjustable guide member 115 and optical fiber cable 120, 120b will now be further described for some embodiments of the present invention with reference to FIGS. 3 and 4. As seen in FIG. 3, an adjustable guide member 415 includes an attachment member, more particularly, a pair of set screws 440, associated with corresponding strength member receiving openings 454 in the guide member 415 positioned above the opening 450 in the guide member 415 and on opposite sides of the center line of the guide member 415. The openings 454 receive respective strength members 452 therein extending from the optical fiber cable 420a and the set screws 450 may be tightened against the strength members 452 to attach the strength members 452 in the openings 454. As seen in FIG. 3, the positioning of the openings 452 provides an angular displacement between the strength members 452 and an optical fiber tube 430 extending from the optical fiber cable 420a to force the optical fiber tube 430, with the optical fiber 425 therein, against the guide member 415 in the opening 450 in the guide member 415 so as to direct the optical fiber tube 430 and optical fiber 425 into the groove 110.

As seen in the perspective view illustration of FIG. 4, the strength members 452 extend on opposite sides of the optical fiber tube 430 in the optical fiber drop cable 420. As also seen in FIG. 4, the set screws 440 extend through threaded openings 441 in the guide member 415. Similarly the set screw 458 extends through a threaded opening 459 in the guide member 415 to allow the guide member 415 to be secured to the closure frame 105 at desired longitudinal position.

Figure 5:
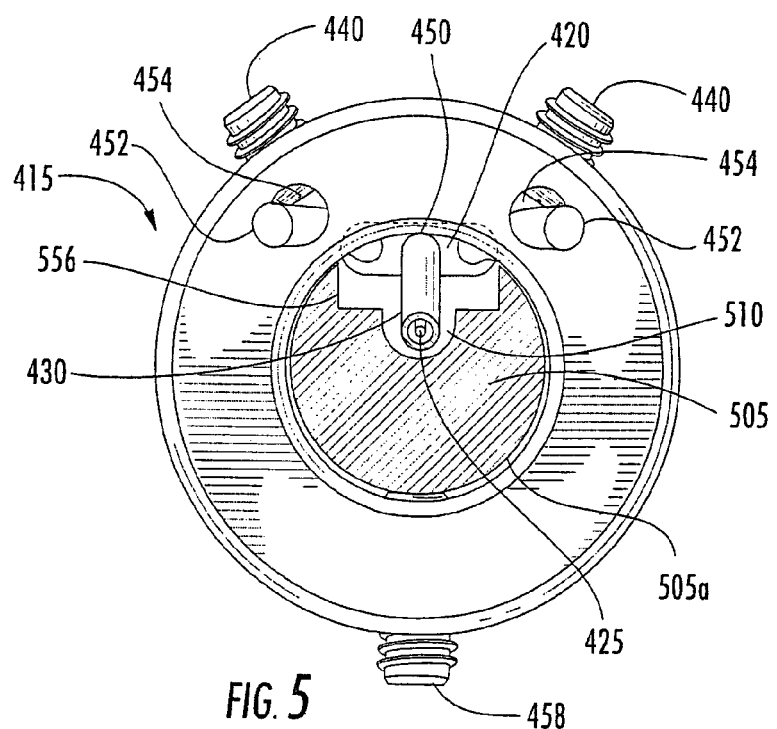
FIG. 5 is a side view of a closure frame with an adjustable guide member with a drop cable thereon according to some embodiments of the present invention.

The guide member 415 is illustrated in FIG. 5 with a closure frame 505 extending through the opening 450. As further illustrated in FIG. 5, the optical fiber tube 430 contacts the inner surface of the opening 450 in the guide member 415 to direct the optical fiber tube 430 and optical fiber 420 into a groove 510 in a face of the closure frame 505. More particularly, the strength member receiving openings 454 are positioned to provide an angular displacement between the strength members 452 and the optical fiber tube 430 extending from the optical fiber cable fiber 420 so as to force the optical fiber tube 430 against the guide member 415 in the opening 450 to direct the optical fiber tube 430 and optical fiber 420 into the groove 510. The embodiments in FIG. 5 further show a guide channel 556 configured to receive the flat drop cable 420 therein.

Figure 6:
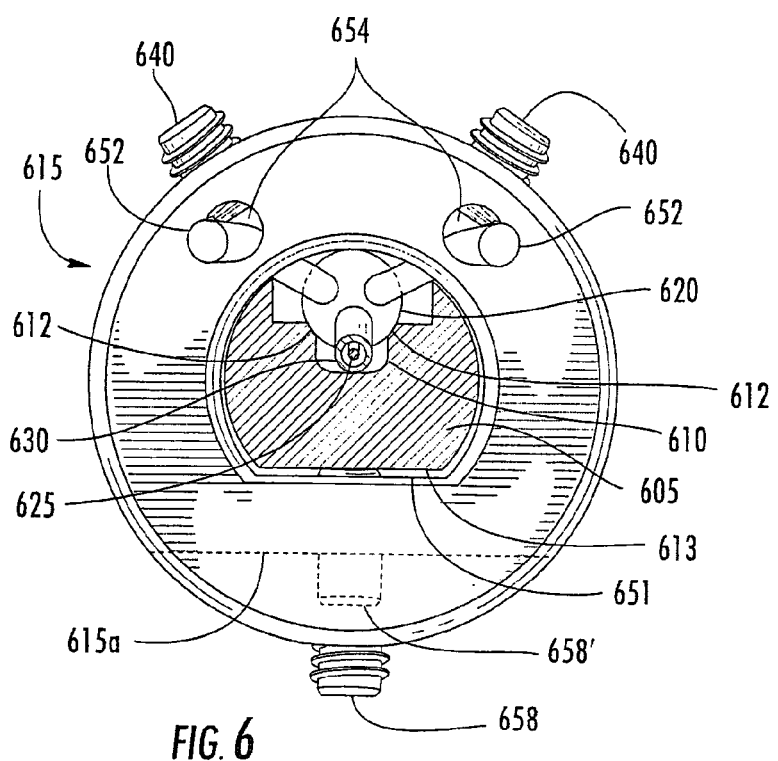
FIG. 6 is a side view of a closure frame with an adjustable guide member with a drop cable thereon according to further embodiments of the present invention.

FIG. 6 illustrates further embodiments of the present invention. The embodiments illustrated in FIG. 6 are shown with a round drop cable 620 rather than a flat drop cable 420 as described with reference to FIG. 5. The round drop cable 620 has an optical fiber tube 630 extending therein with an optical fiber 625 within the optical fiber tube 630. In addition, a pair of strength members 652 are positioned on respective sides of the optical fiber tube 630 substantially as described previously with reference to the strength members 452 of the flat drop cable 420. The guide member 615 includes strength member receiving openings 654 and attachment set screws 640 associated with each opening 654 for securing the strength members 652 within the respective openings 654 as was described previously with reference to the openings 454 and set screws 440.

The embodiments of FIG. 6 differ from those described with reference to FIG. 5 in the inclusion in the opening 650 of a rotary limit portion 651, shown as a flat faced portion as contrasted with the circular configuration of the opening 450 of the embodiments of FIG. 5. The rotary limit portion 651 of the opening 650 is configured to contact a rotary limit portion 613 of the closure frame 605. The rotary limit portion 651 of the guide member 615 is thereby configured to limit rotational movement of the guide member 615 about the closure member 605.

The closure frame 605 further differs from the closure frame 505 described with reference to FIG. 5 in the configuration of the receiving portions thereof for receiving the optical fiber cable 620, the optical fiber tube 630 and the optical fiber 615. In particular, the closure frame 605 includes longitudinally extending contact surfaces 612 configured to receive the round drop cable 620. As illustrated in FIG. 6, the contact surfaces 612 include edges of a groove 610 configured to receive the optical fiber tube 630 and optical fiber 625.

Further embodiments of the guide member 615 are also shown in dotted line in FIG. 6. More particularly, in some embodiments of the present invention, both the outer circumferential shape of the guide member 615 and the opening 650 have flattened portions. As shown in dotted line in FIG. 6, a flat portion 615a may be provided at an angular location corresponding to the rotary limit portions 651, 613. The set screw 658' for securing the closure frame 605 may then be positioned in and extend through the flat portion 615a of the guide member 615.

Figure 7:
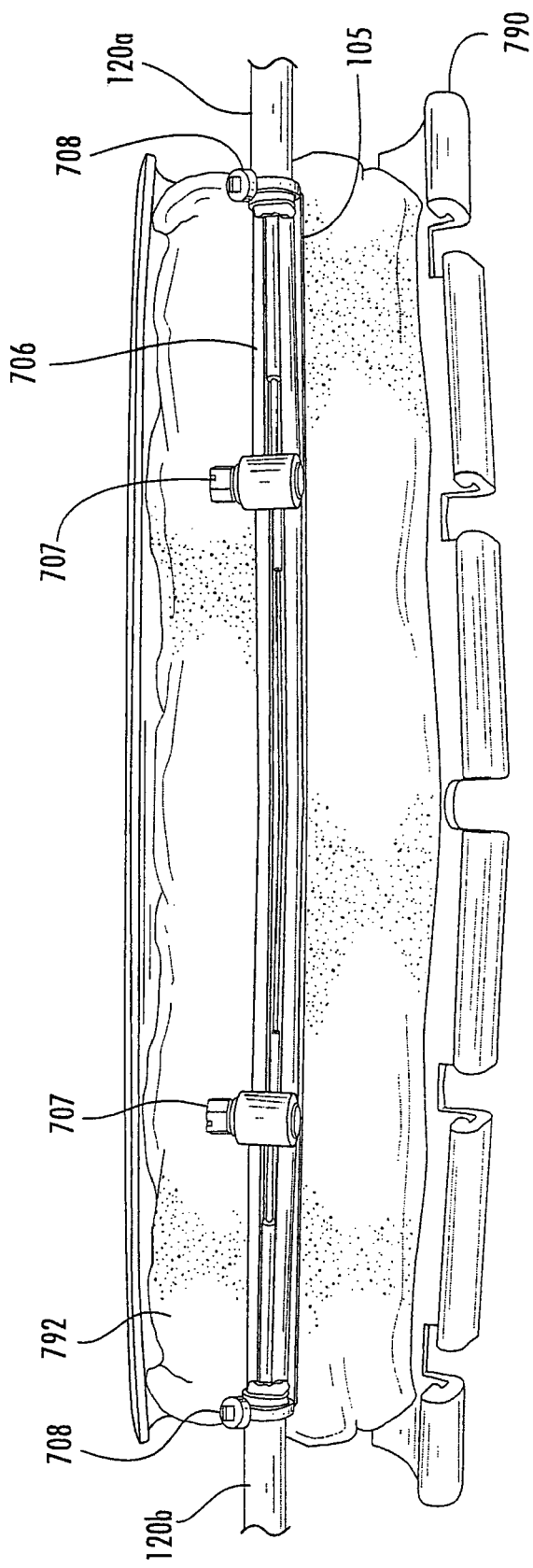
FIG. 7 is a perspective view of a closure frame and outer closure according to some embodiments of the present invention.

Further embodiments of the present invention will now be described with reference to FIG. 7. As shown in the embodiments of FIG. 7, a closure member 105 may be provided with a splice cover 706 configured to be positioned on the closure frame 105 over the groove 110. A pair of hose clamps 707, as shown in the embodiments of FIG. 7, couple the splice cover 706 to the closure frame 105. In addition, tie wraps 708 are shown securing respective fiber optical cables 120a, 120b to the closure frame 105. An outer closure 790 is positioned around the closure frame 105 with an environmental sealant 792, such as a silicon gel, on an inside surface thereof.

Figure 8:
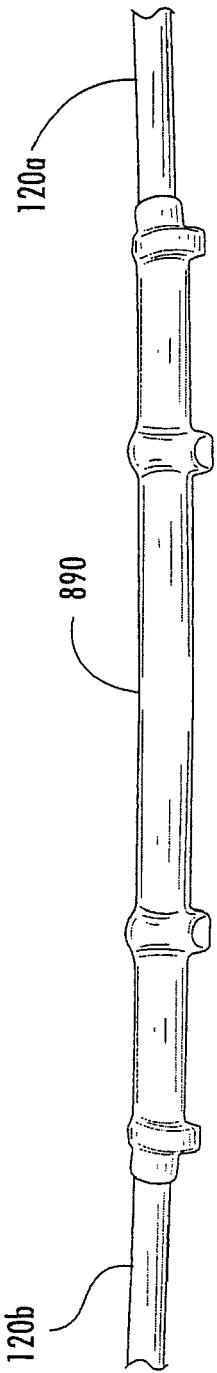
FIG. 8 is a perspective view of a closure frame and outer closure according to further embodiments of the present invention.

The hose clamps 707 may also be configured to retain the strength members 452, 652 at a fixed longitudinal position and the tie wraps 708 may hold the optical fiber drop cables 120a, 120b at a fixed longitudinal position relative to the closure frame 105. Thus, the strength members 452, 652 may be held in a fixed longitudinal position relative to the cables 120a, 120b, which may be beneficial when the outer closure 790 including the closure frame 105 is subjected to changing temperature and other environmental conditions as the strength members 452, 652 are typically of a material that is temperature stable while other components such as the optical fiber tube 430 may be subject to dimension change with temperature. As shown in the embodiments of FIG. 8, which will be described further below, in other embodiments of the present invention the outer closure 790, 890 itself may provide for fixing the longitudinal position of the strength members 452, 652 relative to the drop cables 120a, 120b.

While hose clamps 707 are shown as retaining the strength members 452, 652 in a desired longitudinal position in FIG. 7, it will be understood that, in other embodiments of the present invention, the hose clamps 707 are not used. The retainer 135 or guide member 115 may be used in place of the hose clamps 707 to retain the strength members in a desired position. The splice cover 706 may be connected to the closure frame 105 by a snap fit or the like.

The spacing between the strength members 452 and optical fiber tube 430 provided by the guide member 415 (see FIG. 4) may advantageously allow the environmental sealant 792 to fill the area therebetween. As such, flow of water and the like into the closure 790 from inside the cable 120, 420 when, for example, the sheath of the cable 120, 420 has been torn, may be limited to prevented.

The closure 790 illustrated in the embodiments of FIG. 7 is a cold seal outer closure that is sealed around the closure frame 105 by wrapping around the closure frame 105 and coupling to itself at longitudinally extending edges of the closure 790 to provide environmental sealing for a cable splice positioned in the closure frame 105. The closure 790 may, in some embodiments, include additional securing wraps thereon that may provide strain relief for the optical fibers 120a, 120b extending therein. An alternative version of an outer closure 890 is shown in FIG. 8. The outer closure 890 in the embodiments of FIG. 8 is a heat shrink closure.

Figure 9:
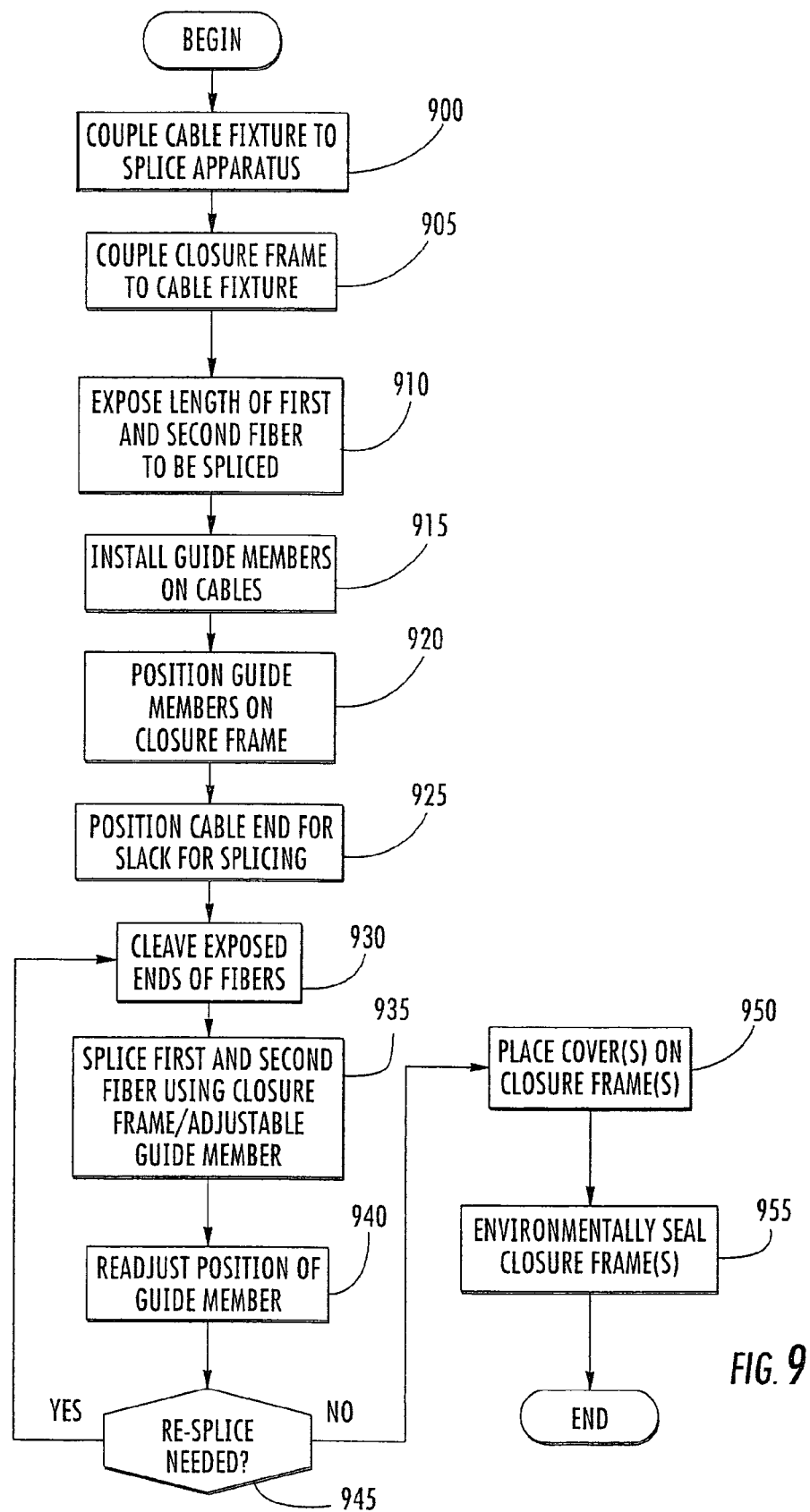
FIG. 9 is a flowchart illustrating operations for splicing an optical fiber according to some embodiments of the present invention.
Figure 10:
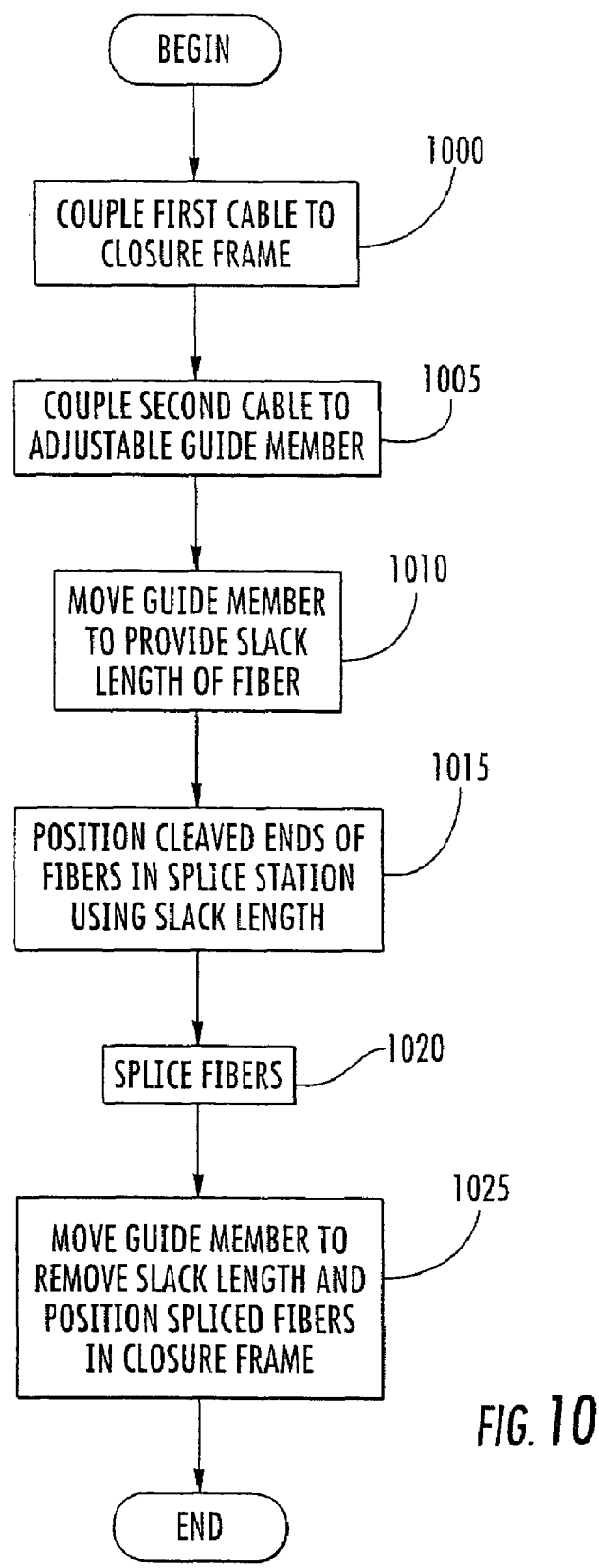
FIG. 10 is a flowchart illustrating operations for splicing an optical fiber according to further embodiments of the present invention.

Methods for splicing optical fibers according to various embodiments of the present invention will now be described with reference to the flow chart illustrations of FIGS. 9 and 10. Referring first to FIG. 9, operations begin with coupling of a cable fixture 160 to a splice apparatus 180 including a splice station 282 (Block 900). The closure frame 105 is coupled to the cable fixture 160 (Block 905). However, while shown as preceding the cable splice operations in FIG. 9, it will be understood that cable preparation and attachment of cables to the closure frame may occur prior to the described operations of Block 905.

In some embodiments of the present invention, preparation of the optical fibers for splicing includes exposing a length of the first optical fiber and a length of the second optical fiber to be spliced (Block 910). As illustrated in the embodiments of FIG. 9, guide members 415, 615 are installed on respective cable ends, for example, as illustrated in FIG. 4 (Block 915). The guide members 415, 615, with the cables attached thereto, are installed/secured onto the closure frame 105 (Block 920). The ends of the cables are positioned using one (or both) of the guide members 415, 615 to provide slack for splicing (Block 925). Note that, as will be described with reference to FIG. 10, various of the operations, such as those of Blocks 915-925, may be incorporated as part of the splice operations at Block 935.

Exposed ends of the respective first and second optical fiber are cleaved preparatory to splicing the cleaved ends (Block 930). The first and second optical fibers may then be spliced using the closure frame with adjustable guide member described previously as will be further described for various embodiments of the present invention with reference to FIG. 10 (Block 935).

The position of the adjustable guide member is re-adjusted and the guide member is secured to the closure frame in a position where the spliced optical fibers therein have any slack length removed (Block 940). Where results are not satisfactory and a re-splice is needed (Block 945), operations at Blocks 930-940 may be repeated.

As discussed above, repair of a drop cable optical fiber may, in some instances, be provided by use of a single closure frame and splice while, in other embodiments, two different closure frames and splices are utilized with an additional length of bridging cable provided extending therebetween, for example, when insufficient slack is left at the damaged region to provide a splice effectively due to length limitations. Accordingly, if an additional splice is needed to complete the repair, as when a re-splice is needed (Block 945), the operations described with reference to Blocks 930-940 may be repeated for an additional splice. Thus, operations may be repeated at Block 945 where, for example, a break in a broken fiber drop cable defines a first and second exposed end of the broken optical fiber therein. A bridging optical fiber cable length may be utilized with cleaved ends extending from both ends thereof that are spliced to cleaved ends of respective ends of a broken optical fiber extending from the ends where the break occurred. First and second closure members can be utilized for the respective coupling of broken exposed ends of an optical fiber in an optical fiber drop cable to respective ends of the broken optical fiber. It will also be understood that a broken optical fiber drop cable may actually comprise a plurality of optical fibers that have been broken and require splicing. In such instances, the splicing operations as described at Blocks 930 through 940 may be repeated for respective ones of the optical fibers.

If no re-splice (or additional splice) is needed (Block 945), a splice cover 706 may be placed on the closure frame 105 with the splice optical fibers therein (Block 950). The closure frame with the spliced optical fibers therein may then be environmentally sealed (Block 955). The environmental sealing may be, for example, securing a heat shrink and/or cold seal outer closure around the closure frame.

Operations relating to splicing of optical fibers will now be further described with reference to the flow chart illustration of FIG. 10 for some embodiments of the present invention. For the embodiments illustrated in FIG. 10, operations begin at Block 1000 by coupling a first optical fiber cable to a longitudinally extending closure frame. A second optical fiber cable is coupled to an adjustable guide member on the closure frame (Block 1005). Attachment of the closure frame to the cable fixture, as described with reference to Block 905 of FIG. 9, may occur after coupling of the optical fiber cable at Block 1005 in some embodiments of the present invention. The adjustable guide member is moved toward the first optical fiber cable to provide a distance between the first and second optical cable less than exposed length of the first and second optical fiber therebetween (Block 1010). In other words, operations at Block 1010 may be utilized to provide a slack length of optical fiber that may be needed to move the optical fibers to a splice station and the like.

Cleaved exposed ends of a first optical fiber from the first optical fiber cable and a second optical fiber from the second optical fiber cable are positioned proximate each other in a splice station displaced from the closure frame, utilizing the slack length of optical fiber (Block 1015). The first and second optical fibers are spliced in the splice station (Block 1020). The adjustable guide member is then moved away from the first optical fiber cable to remove the slack length and position the spliced optical fibers in the closure frame (Block 1025).

As described above for various embodiments of the present invention, a cable fixture may be provided that can be temporarily attached to a splice machine and provide attachment points for a closure frame in close proximity to the splice machine, which may be particularly helpful for in-line splicing. A closure frame for use in supporting the splice may then be temporarily attached to the cable frame and provide drop cable attachment points that are longitudinally adjustable thereon. The closure frame may, thereby, provide a controlled way of re-positioning drop cables. A fiber/splice groove may be included in the closure frame the contains the bare fiber and any splice protection sleeve positioned over splice point between the fibers. In addition, some embodiments of the present invention utilize a strength member anchor point that secures strength members to a guide member of the closure frame that allows adjustable movement thereof. By utilizing the strength members for connecting the drop cables to the closure frame, mechanical strength may be provided to prevent or limit cable ingress or egress from the work station.

In some embodiments of the present invention, a splice covering may be provided over the closure frame covering the groove and splice therein for further protection of the exposed fiber and an outer closure may be provided to protect the rest of the assembly that may provide sealing thereof. The outer closure may or may not be re-enterable and may provide some level of strain relief to the cable. After the drop cables are prepped and fibers are cleaved, the ends may be brought together and secured to the closure frame utilizing the strength members of the cable for securing. The ends of the fiber may be spliced and then the drop cables may be repositioned to eliminate any superfluous loops of fiber, which may provide a very slim splice closure. A splice cover may be installed and an outer closure may be wrapped or shrunken around the completed splice and splice closure frame. Accordingly, various embodiments of the present invention may provide for improvements in repairs or splicing connections for drop cables and the like in the field or otherwise.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method for splicing optical fibers, the method comprising:

coupling a first optical fiber cable to a longitudinally extending closure frame;

coupling a second optical fiber cable to an adjustable guide member on the closure frame;

moving the adjustable guide member toward the first optical fiber cable to provide a distance between the first and second optical fiber cable less than an exposed length of the first and second optical fiber therebetween to provide a slack length of optical fiber;

positioning cleaved exposed ends of a first optical fiber from the first optical fiber cable and a second optical fiber from the second optical fiber cable proximate each other in a splice station displaced from the closure frame utilizing the slack length of optical fiber;

splicing the first and second optical fibers in the splice station; and moving the adjustable guide member away the first optical fiber cable to remove the slack length and position the spliced optical fibers in the closure frame.

2. The method of claim 1 wherein positioning exposed cleaved ends is preceded by:

exposing a length of the first optical fiber;

exposing a length of the second optical fiber; and cleaving respective exposed ends of the first and second optical fiber.

3. The method of claim 2 wherein moving the adjustable guide member is followed by:

securing the adjustable guide member to the closure frame in a position where the spliced optical fibers therein have the slack length removed; and environmentally sealing the closure frame with the spliced optical fibers therein.

4. The method of claim 3 wherein environmentally sealing is preceded by placing a cover on the closure frame with the spliced optical fibers therein and wherein environmentally sealing comprises securing a heatshrink and/or cold seal outer closure around the closure frame.

5. The method of claim 1 wherein moving the adjustable guide member is preceded by:

coupling a cable fixture to a splice apparatus including the splice station; and coupling the closure frame to the cable fixture.

6. The method of claim 1 wherein the method comprises repairing a broken fiber drop cable where the break defines a first exposed end and a second exposed end of a broken optical fiber therein and wherein the first exposed end comprises an exposed end of the first optical fiber cable and wherein the second optical fiber cable comprises a bridging optical fiber cable with an opposite cleaved end of the second optical fiber extending from the bridging optical fiber and wherein the opposite cleaved end of the second optical fiber is spliced to the second exposed end of the broken optical fiber cable using a second closure frame.

7. The method of claim 1 wherein the first optical fiber comprises a first plurality of optical fibers and the second optical fiber comprises a second plurality of optical fibers and wherein splicing the first and second optical fibers comprises splicing respective ones of the first and second plurality of optical fibers.

8. The method of claim 1 wherein splicing the first and second optical fibers is followed by positioning a protective sleeve over the splice and wherein moving the adjustable guide member includes positioning the protective sleeve in the closure frame.

9. The method of claim 1 wherein the second optical fiber cable includes a strength member and wherein coupling the second optical fiber cable to an adjustable guide member comprises connecting the strength member to the adjustable guide member.

* * * * *